July 31, 1934.  H. H. LINN  1,968,046
TRAILER CONSTRUCTION
Filed Sept. 10, 1930  5 Sheets-Sheet 1

July 31, 1934. H. H. LINN 1,968,046
TRAILER CONSTRUCTION
Filed Sept. 10, 1930 5 Sheets-Sheet 2
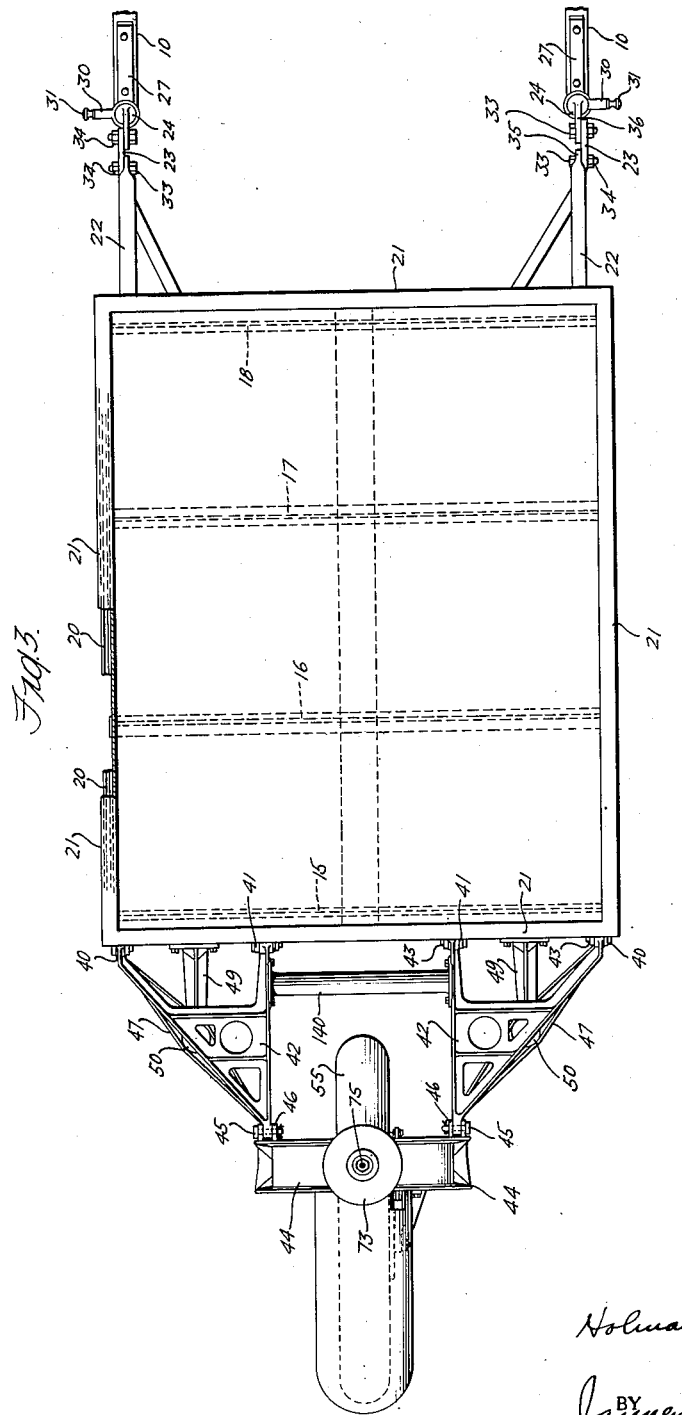

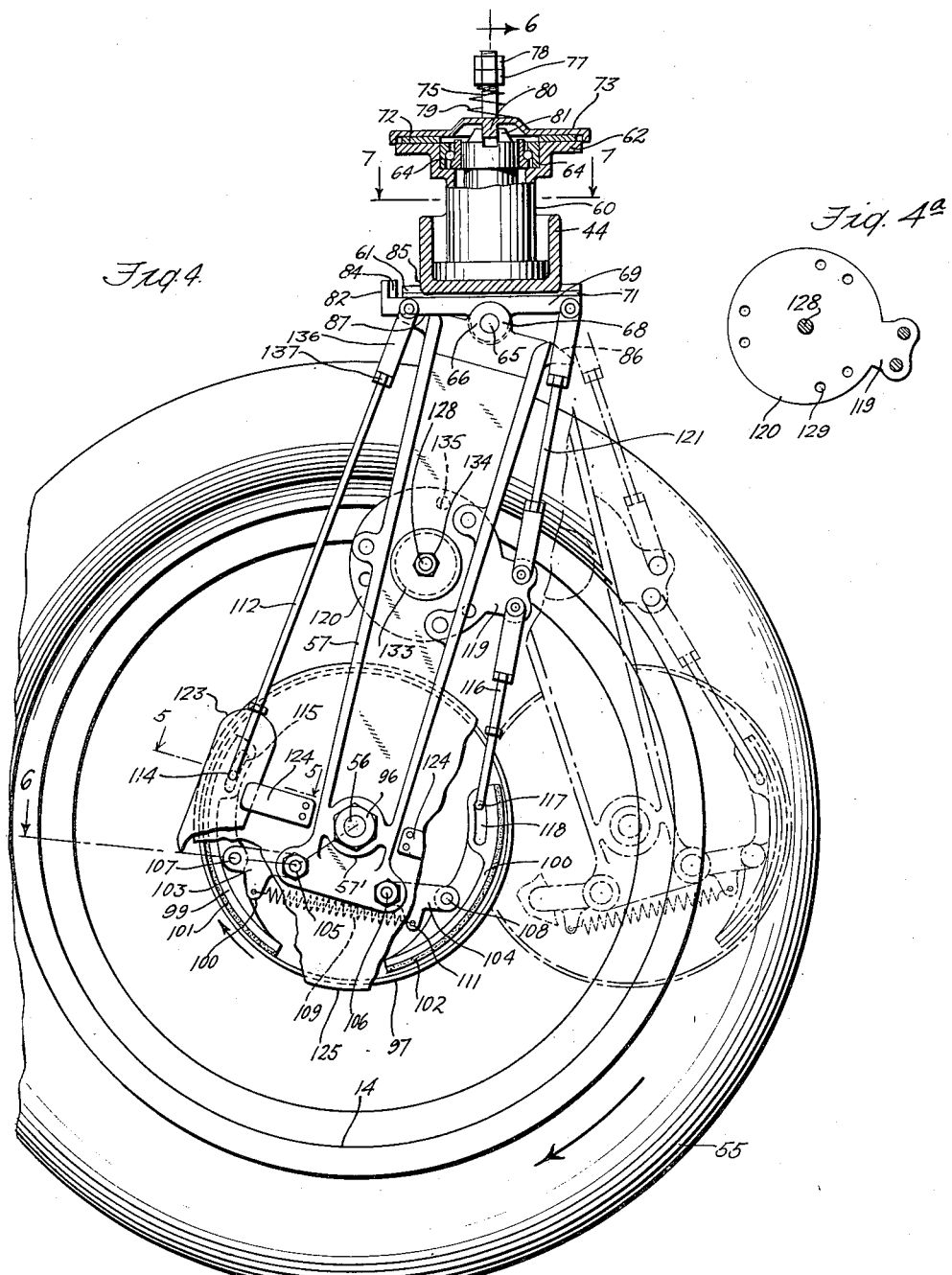

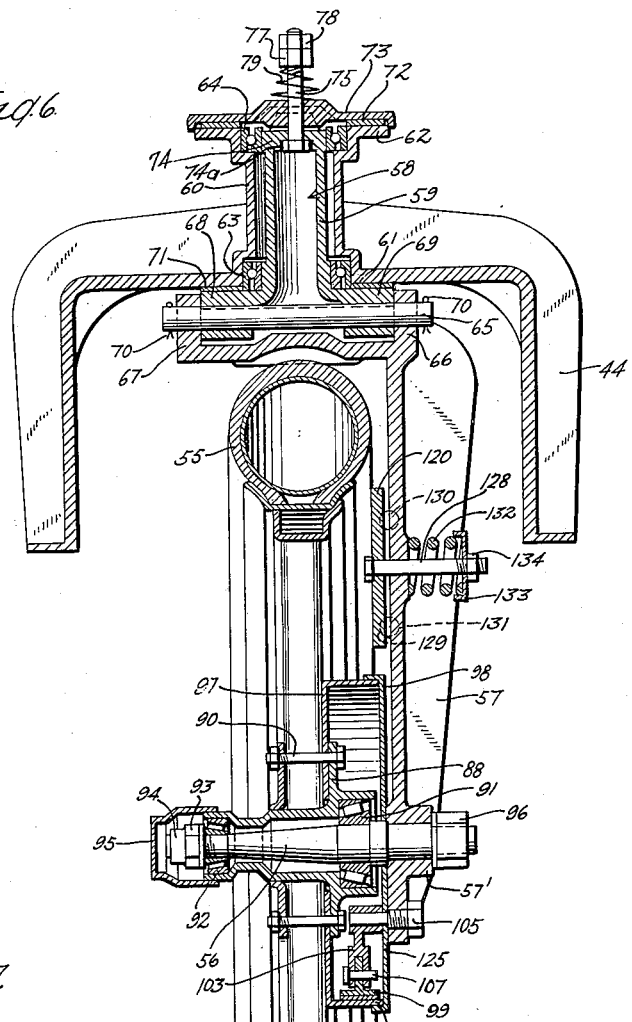
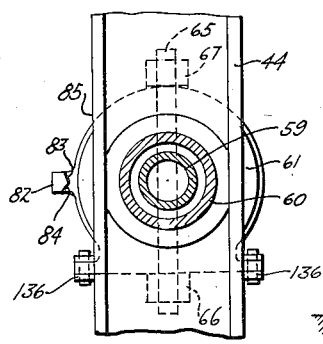

July 31, 1934.  H. H. LINN  1,968,046
TRAILER CONSTRUCTION
Filed Sept. 10, 1930  5 Sheets-Sheet 5
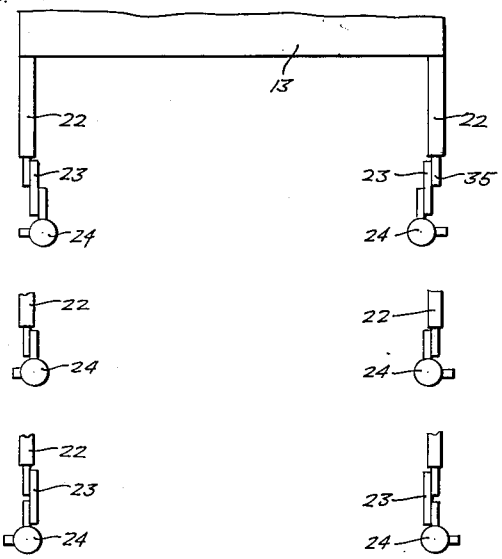
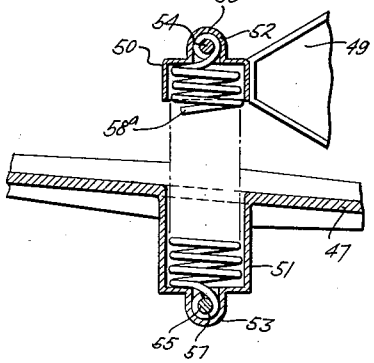
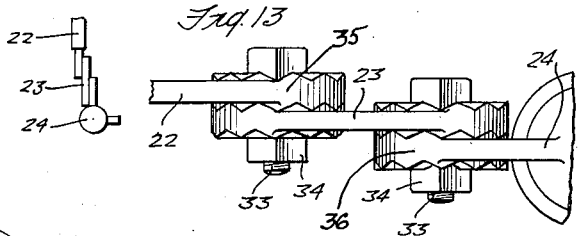
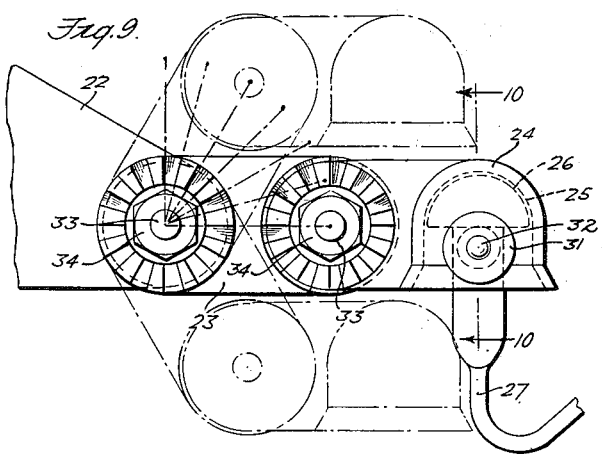
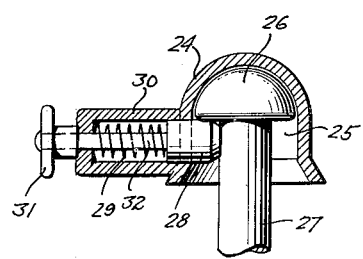

Patented July 31, 1934

1,968,046

UNITED STATES PATENT OFFICE 1,968,046

TRAILER CONSTRUCTION

Holman H. Linn, Morris, N. Y., assignor to Linn Trailer Corporation, Oneonta, N. Y., a corporation of New York Application September 10, 1930, Serial No. 480,978

29 Claims. (Cl. 280—33.4)

This invention relates to vehicle construction and more particularly to construction for automobile trailers and the like.

One of the objects of this invention is to provide a vehicle construction in which a supporting wheel or wheels may be dependably made to follow tractional changes of movement of the vehicle, but without necessitating a 180° castering or complete turning around of the wheel mounting when the direction of movement of the wheel is reversed. Another object is to provide a practical, inexpensive and dependable caster wheel construction in which reversal of the direction of rotation of the wheel is made automatically and dependably effective to cause the wheel to caster to a new trailing position; but in which accidental castering due to uneven road conditions will be effectually prevented. Another object is to provide a castering wheel mounting which will be effective to prevent "shimmying" of the vehicle or trailer which it supports under widely varying conditions of load and speed of travel. Another object is to provide a thoroughly practical, rugged and durable construction of the above mentioned character and, moreover, one that will be of dependably and wholly automatic action, and satisfactorily resistant to torsional stresses under the varying conditions of practical use. Another object is to provide a construction for a trailer adapted to be secured to a self-propelled vehicle, such as an automobile or tractor, for example, that will be capable of being readily attached to or detached from the vehicle, capable of being easily and effectively manipulated or handled, either when detached from or when attached to the self-propelled vehicle and capable of being readily and dependably adjusted to meet varying characteristics of automobile and trailer construction. Another object is to provide a mounting for a wheel of the above mentioned character which will be of simple construction, may be readily assembled, and in the use of which tire-changing, when necessary, is greatly simplified. Other objects will be in part obvious and in part pointed out hereinafter.

The invention accordingly consists in the features of construction, combination of elements, and arrangements of parts as will be exemplified in the structure to be hereinafter described and the scope of the application of which will be indicated in the following claims.

In the accompanying drawings in which is shown one of the various possible embodiments of my invention:

Figure 1 is a side elevation of a trailer embodying my invention, shown removably hitched or coupled to the rear extension of a car frame, part of the body of the trailer being broken away and sectioned to show certain features of its construction.

Figure 2 is a cross-section taken along line 2—2 of Figure 1.

Figure 3 is a top plan view of the trailer shown in Figure 1, with a part of the body frame broken away to show its construction.

Figure 4 is an enlarged view of the trailer-supporting wheel and its mounting partly shown in elevation and partly in cross-section with other parts broken away, more clearly to illustrate features of construction.

Figure 4a is a detached view of part of the retaining mechanism shown in Figure 4.

Figure 5 is a detail cross-section taken on line 5—5 of Figure 4.

Figure 6 is a cross-section taken substantially on line 6—6 of Figure 4.

Figure 7 is a cross-section taken on line 7—7 of Figure 4.

Figure 8 is a diagrammatic sketch showing some of the various possible connections between the towing brackets of the trailer and the rear frame extension of the car to which it is attached.

Figure 9 is an enlarged view of the parts comprising the connection between the trailer and the car frame.

Figure 10 is a cross-section taken on line 10—10 of Figure 9.

Figure 11 is a sectional detail showing the mounting of the body spring which forms a resilient supporting connection between trailer body and castering wheel.

Figure 12 is a diagrammatic showing of a possible arrangement of the component parts of a towing bracket.

Figure 13 is an enlarged plan view, substantially as seen from above in Figure 9, of the connecting parts between the trailer and towing vehicle.

Similar reference characters refer to similar parts throughout the several views of the drawings.

Referring now to the drawings, and more particularly to Figure 1, there is shown at 10 the frame extension or spring-horn of the rear portion of an outomobile, but it is to be understood that any other suitable vehicle, preferably self-propelled, may be used, though certain features of my invention are of peculiar advantage in connection with automobiles and tractors. Attached to the automobile extension 10 is a trailer comprising a body 13 and preferably a single wheel 14. The attachment of the latter to the body 13 and of the body 13 to the automobile will be described in greater detail hereinafter.

The body 13 is preferably made of sheet or plate metal and may be of any suitable shape or form. Preferably, the body, as will be clear from Figures 1, 2 and 3, is substantially rectangular or boxlike in shape and may be of any convenient or suitable depth. The body 13 has extending transversely thereof, on the under side of the bottom, a plurality of crossbeams shown as four in number and made up preferably of the Z-beams 15, 16, 17 and 18. The crossbeams 15 and 18 are at the respective ends of the body 13 while the crossbeams 16 and 17 are positioned at substantially equally spaced distances from the end beams, and from each other. As seen in Figure 2, each of these crossbeams is substantially triangular in shape, the lower flanges thereof meeting the plane of the upper flange at the bottom of the car body and meeting each other along the longitudinal center line of the body at a substantial depth below the body. These crossbeams are preferably secured to the car body by spot welding at points along the upper flange and by further welding along the edge of the upper flange and at the ends thereof.

Extending lengthwise and centrally of the body 13 and underneath the bottom thereof is a tubular torque member 19, preferably of steel and passing through suitable openings in the webs of the crossbeams 15, 16, 17 and 18, to which webs said member is rigidly secured, preferably by welding to the edge of the opening in each crossbeam entirely around the periphery of the torque member. By securing the torque member as described to the crossbeams of the trailer body, the torque member is made substantially an integral part of the body and is very effective to resist the twisting or torsional stresses to which the trailer body is subjected in use.

As a further means of imparting strength and rigidity to the body while at the same time maintaining the lightness of weight desirable in such a construction, I have employed means for supporting the upper edge of the trailer body along all four sides thereof. This means comprises preferably U-shaped members or channels 20 which extend along each of the upper edges, beneath the outwardly and downwardly turned fold 21 formed at the upper edge of each end and side of the body. These U-shaped members are securely welded both to the downwardly turned portion of the fold 21 and to the side or end of the trailer body, as the case may be, and thus forms with the body flange or fold a full, square, substantially integral section or frame extending around the entire upper edge of the body. A pair of towing brackets 22, formed substantially as shown in Figures 1 and 3, is secured to the trailer body and by means of these brackets and co-acting parts the trailer body is coupled to the frame extensions 10 of the automobile or other vehicle. As these two brackets are alike and as each is attached to the automobile frame in the same manner, a detailed description will be given of but one of such connections.

To the towing bracket 22 is bolted an extension link 23 and to the outer end of that is again bolted a ball-socket member 24 provided at its outer end with a downwardly turned socket 25 (see Figures 9 and 10) which is adapted to fit over and receive the ball-shaped head 26 of the ball-strap 27 carried by and rigidly secured to the car extension 10, as is clearly shown in Figure 1. It will be understood that this connection need not be made to the spring-horn of the automobile but may be made to a bumper or to any other convenient part. While normally the weight of the load upon the trailer tends to hold the ball and socket in secure interrelation, I have provided a latch member for insuring that the parts do not become separated due to jolting or bumping over an uneven surface. This latch comprises a plunger 28 which in its locked position extends under the head 26 of the ball-strap 27 and is retained in that position by means of a spring 29, which is mounted together with the plunger 28 in a plunger cylinder 30 forming a lateral extension of the socket member 24. A knob 31 is secured upon the end of the plunger stem 32 by which means the plunger may be retracted out of locking engagement with the ball 26 when it is desired to separate the ball and socket coupling device to uncouple the trailer from the car or other vehicle to which it is secured. It will be readily understood that this simple ball and socket construction, with its novel locking means, forms a practical and rugged construction permitting quick and secure attachment of the trailer to the self-propelled vehicle.

Since automobiles have frame members or other attachment parts spaced at widely different distances and since these parts vary considerably in height above the ground, I have provided quick and easy adaptation of the trailer for connection to such vehicles without change in the location of the bracket members 22 or in the ordinary structural features of the car. In this connection the connecting or extension link 23 plays an important part, as may be clearly seen by reference to Figures 8, 9 and 13. This link is securely clamped to the bracket member 22 at one end and to the socket member 24 at the other end by bolts 33 and nuts 34 which pass through the mating ends 35 and 36 (respectively of parts 22 and 24) which are each provided upon both sides thereof with corrugated surfaces formed by substantially radially extending V-shaped recesses disposed at intervals of preferably 30° (see Figure 9). The connecting ends of the link member 23 are similarly provided on both sides with V-shaped recesses so that when the link is secured to the bracket 22 and to the socket member 24 by means of the retaining bolts, the corrugations on one part will register with the opposing corrugations upon the other part to lock the members together in whatever angular relation in which they may be assembled. With the grooves or recesses disposed at substantially 30°, the link 23 may be swung upwardly 90° from its horizontal position or downwardly 90° from its horizontal position, or may occupy that one of the intermediate positions, respectively angularly disposed 30° or 60° above or below such horizontal position, as may be found desirable. As is clear from Figure 13, a V-shaped recess on one side of a member (such as of part 35) is opposite the crest or high portion on the other side; with this arrangement, the above described height changes may be made in steps of 15°, by reversing the intermediate link 23 when a 15° step is desired. Figure 9 shows diagrammatically a few of the many different height and length adjustments I can achieve.

In order to secure width adjustment different arrangements or combinations may be made between the bracket, link and socket member as indicated in Figure 8. By including or omitting the link and by varying the disposition of the parts, five different width adjustments may be attained. Should it be desired to increase the number of possible adjustments, this may easily be attained by introducing a washer member, not shown, between the bracket extension end 35 and the link 23. This will greatly multiply the number of possible positions which the socket member may occupy relatively to the bracket and so provide a great number of additional width adjustments. This principle may be carried further by the use of an additional extension link which will again make possible a great number of combinations and provide many more width, length and height adjustments.

Referring now to Figures 1 and 3, it will be seen that at the rear end of the trailer body are provided upper and lower outer brackets 40, and inner brackets 41, attached to the rear end of the body 13 by riveting, welding, or in any other suitable manner. The upper brackets 40 and the brackets 41 form means for attaching to the rear of the body a pair of A frames 42. The forward legs of each A frame are secured to brackets 40 and 41 by means of pins 43, while the rear end or apex of each A frame is secured to a saddle 44, later to be more fully described. This connection is made by means of other pins 45 which pass through ears 46 formed upon the saddle member 44 and through a portion of the A frame disposed between said ears. Disposed in parallelism beneath the A frames are a pair of spring-strap members 47 each of which is secured at its respective ends to lower ears 46 formed upon the lower portions of the saddle member and to the lower brackets 40 hereinbefore described. These connections are made by means of pins in the same manner as are the A frame connections. It should be noted that the straps 47 and the A frames are so connected to the body and to the yoke member 44 as to be able to swivel about the several pins 23 and to remain always in parallel relation to each other. This provides that the axis of the saddle or yoke member 44 will always remain substantially parallel to the vertical axis of the trailer body.

Rigidly secured to the rear end of the body 13 are a pair of brackets 49 each of which provides a cuplike spring-retaining portion 50 (see Figures 1 and 11) which is downturned above a spring-cup 51 provided upon a strap member 47. Cup member 50 has an upwardly extending hollow portion 52 and spring-cup 51 has a downwardly extending hollow portion 53. Passing transversely through these said hollow portions 52 and 53 are pins 54 and 55 adapted respectively to secure in said hollow portions the looped ends 56 and 57$^a$ of a compression spring 58$^b$ which is seated in said cup members. Thus connected, these compression springs serve as resilient means for supporting the weight of the load upon the wheel 14 and also serve as shock absorbers or snubbers for checking excessive rebound when the vehicle is traveling over rough roads.

As above noted, the rear or left-hand end of the trailer, as viewed in Figure 1, may be supported by one or more wheels 14, and where more than one wheel 14 is employed, it will be understood that they are horizontally spaced from each other. It will suffice, however, to describe in detail the construction and mounting of only one wheel, since, where more than one wheel is employed, the construction and mounting of all of the wheels may be the same. The wheel 14, referring now more particularly to Figures 1, 4 and 6, may be and preferably is rubber-tired, as is indicated at 55, and is rotatably mounted in a manner to be more fully described hereinafter, upon a spindle 56 carried at the lower end of an arm or half-fork 57.

The arm 57 is carried by a trunnion generally indicated at 58, which trunnion comprises a vertically extending cylindrical hollow post 59 mounted for rotation, preferably to a limited degree, in a housing 60 which extends upwardly, co-axial with respect to the vertical axis of the saddle or yoke member 44. Preferably, the housing 60 is so supported that the axis of rotation of the trunnion 58 therein is substantially vertical. At its lower end the housing is provided with a substantially circular or annular flange 61 and at its upper end another annular flange 62. This housing carries bearing assemblies 63 and 64 respectively located adjacent its lower and upper flanges, which bearings provide for anti-friction rotation of the trunnion 58 within the housing. The arm 57 is hinged to trunnion 58 by means of a hinge pin 65 which passes through two spaced lugs 66 and 67 formed at the upper end of the arm 57, and also passes through a semi-cylindrical boss 68 formed upon the bottom of a substantially annular flange 69, integrally formed at the lower end of trunnion 58. Hinge pin 65 is prevented from accidental displacement by means of cotter pins 70.

Interposed between flange 61 of the housing and flange 69 of the trunnion is a friction-washer 71, composed of fiber or other suitable composition. A similar washer 72 is interposed between the upper flange 62 of the housing and a friction-cap 73. The friction-cap is flanged at its periphery to extend downwardly and embrace the peripheral edge of the flange 62, thus efficiently protecting the friction-washer from accumulations of dirt or grit, which might tend to destroy its efficiency. The upper end of the trunnion 58 is closed by a wall 74 and co-axially therein an opening is provided for the passage of a bolt 75, having a head located beneath the wall 74, the latter having suitable lugs 74$^a$ engaging the head of the bolt to prevent turning of the latter. Bolt 75 passes upwardly through a central aperture in the cap member 73. A nut 77 and lock nut 78 threaded upon the upper end of the bolt 75 provide means for applying a compressive force upon a spring member 79 which is interposed between the nut 77 and the upper surface of friction-cap 73. The spring 79 and the nuts 77 and 78 thus afford means for adjusting the pressure upon the washer 72, to permit regulation of the frictional resistance to turning provided by the friction-washer. The friction-cap is forced to rotate with the trunnion 58 by means of a tongue and groove relation existing between a downwardly extending lug 80 provided on the under-surface of the cap and an upwardly extending lug 81 provided upon the upper wall of the trunnion 58.

It should be noted here that this arrangement of friction-washers 71 and 72 provides an improved construction for preventing or reducing the tendency of the wheel 14 to "shimmy" when the trailer is drawn at relatively high speeds. This tendency to "shimmy" is governed directly by the weight of the load carried upon the trailer; that is, when the body of the trailer is empty there is less tendency for the wheel to swing out of line than there is when the body is heavily loaded. By providing two friction washers, disposed as described, the pressure upon one of which is controlled by an adjustable spring and the pressure upon the other of which is determined by the load upon the trailer, I have devised an efficient and rugged two-stage friction device which will operate consistently and is to a great extent governed in its action by the load condition. With very little load slight friction exists by reason of the lower friction-washer 71. There is, however, a predeterminate amount of friction existing between the upper friction-washer 72 and the contacting surface of the cap 80 because of the pressure exerted thereon by the spring 79. When the body is lightly loaded and the tendency to "shimmy" is slight, the friction washer 72 functions to prevent such action. However, when a load is applied to the body the additional weight is carried directly or is directly transmitted through the saddle member 44 to the lower friction-washer 71 and increases the pressure per square inch upon said friction-washer in proportion to the load. There is then created between said friction-washer and the adajcent surface of the saddle member 44 frictional resistance to turning which is substantially in direct proportion to the load carried by the vehicle. Thus the load on the vehicle is supported by the lower friction-washer and the bearing assemblies and is transmitted to the arm 57 and wheel 14 in such a way as to facilitate the castering of the wheel and fork, but to a large extent to eliminate the tendency of the wheel and trailer to "shimmy" at high speeds.

The turning of the wheel and trunnion about the vertical axis of the latter is limited in angular extent by means of an upstanding tooth or prong 82 (See Figures 4 and 7) which is provided upon its inner side, that is, the side toward the axis of the trunnion, with two angularly disposed surfaces 83 and 84 adapted to come in contact with the rear edge 85 of the yoke or saddle member 44, when the wheel swings far enough in either direction away from its normal trailing position to bring the parts into engagement. This tooth 82 prevents the arm and trunnion from turning through a 180° angle and thus reversing its position, although permitting sufficient movement about the vertical axis of the trunnion to provide for the side-to-side movement of the trailer as it follows the vehicle to which it is attached, when the latter is caused to turn out of a straight line course.

As has been explained hereinbefore, the arm 57 is mounted to swing about the horizontal axis of the pin 65. The upper end of the arm is shaped as at 86 and 87 so that when said arm is swung a predetermined distance upon either side of the axis of the trunnion, these portions will engage the underside of the flange 69 and limit the swing in either direction. Thus, the castering of the wheel is controlled to a definite angular displacement upon either side of the vertical axis of the trunnion. As seen in Figure 4, the fork is swung to the left of such vertical axis, being limited in this direction of swinging by engagement of the portion 87 with the flange 69. In this relation of the parts the wheel is related to the vehicle to which the trailer is attached so as to trail and properly caster (as by swinging about the vertical axis of the trunnion) as changes in direction of movement of the vehicle takes place, while the latter moves in a direction toward the right, as viewed in Figure 1. Should the direction of movement of the vehicle be reversed, that is, should it move toward the left as seen in Figure 1, the arm 57 and wheel 14 carried thereby are cause, by means of a preferred construction to be more specifically described herein, to swing to the other or right-hand side of the vertical axis of the trunnion, as viewed in the figure. The arm 57 and its wheel 14 then assume the position indicated in dotted lines in Figure 4. In this latter position the portion 86 at the upper end of said arm engages the underside of the flange 69 of the trunnion and limits the swinging movement and ultimate position of the said arm in its position to the right of the said vertical axis. With the parts in this position the wheel 14 is properly positioned to follow and faithfully caster in response to changes in direction of movement of the vehicle as the latter moves in a direction toward the left, as viewed in Figure 1.

Considering now the preferred form of mechanism for controlling the position of the fork and wheel relatively to the axis of the pin 65, reference is first directed to Figure 6 of the drawings. The wheel 14, which may be a spoked wheel, or may be of any other suitable construction in this respect, is provided with a hub member 88 between which and a flange 89 detachably mounted thereon, the spokes of the wheel are secured. Hub 88 and flange 89 are held in their spoke-retaining position by means of a plurality of bolts 90. The hub 88 is mounted upon the spindle 56 by means of inner and outer bearing assemblies 91 and 92, which are contained within properly formed portions of said hub and which bearings are drawn together into suitable tightness by means of any suitable nut and locking means 93 and 94. A hub-cap 95 covers the end of this construction in the usual manner. The spindle 56 is mounted immovably in the enlarged end 57' of the arm 57 and held there by means of the nut 96. Secured to the hub 88, as by means of the bolts 90, is a brake-drum 97 which may be of any usual construction. Covering this is a brake-drum cover 98, provided to protect the interior of the drum from accumulations of dirt or grease.

Having described so far the mounting of the wheel upon the fork and trunnion, it should be noted that this form of half-fork or arm offers great advantages over the ordinary fork construction. With the latter construction much inconvenience is experienced when it becomes necessary to change a tire, as the wheel must be removed from between the forks in order that this may be accomplished. With my new construction, however, tire changing is greatly simplified for the tire may be removed and changed when necessary without removing the wheel or any portion of the wheel mounting.

Improved means have also been provided for causing the wheel to caster when the direction of the trailer is reversed. Referring to Figures 4, 5 and 6, the interior of the brake-drum 97 is shown as being provided with oppositely disposed brake-shoes 99 and 100, having brake-linings 101 and 102. These shoes are supported in operative position within the drum by means of brake-shoe levers 103 and 104 carried by pivots 105 and 106 which are secured in spaced relation at the lower end of arm 57. Shoe 99 is secured to lever 103 by means of a pivot pin 107 and brake-shoe 100 is secured to brake-shoe lever 104 by means of a pivot pin 108. A spring 109 connects the two brake-shoe levers and is secured to projections 110 and 111 formed upon said levers respectively. In Figure 4, the wheel occupies the position it would have when the trailer is traveling toward the right-hand side of the drawing as seen in Figure 1. In this position the brake-shoe 99 and its lever 103 are free to float within the drum and with the wheel traveling in the direction of the arrow shown in Figure 4, the brake-shoe is free to be slightly lifted by its contact with the turning brake-drum and to engage lightly and practically without friction against the periphery of the brake-drum. Although assisted by spring 109, gravity is the principal agent tending to hold the shoe against the drum and permits very light contact between the brake-shoe lining and the drum, so long as rotation of the drum takes place in a clockwise direction. At 112 is shown a brake-shoe lifting-rod which is pivotally mounted, as at 113, upon a part of the trunnion flange 69 at a point to the left of the vertical axis of the trunnion, as seen in Figure 4. This rod is furnished at its lower end with a pin 114 disposed at right angles to the said rod and movable within a slot 115 formed in the upper part of brake-shoe 99. Brake-shoe 100 is similarly related to a lift-rod 116 having a pin 117 slidable within a slot 118 formed in said brake-shoe and pivotally mounted at its upper end to an arm 119 formed upon a disk 120, the purpose of which will be hereinafter fully described. The arm 119 of said disk has also pivotally connected thereto an arm lock-rod 121 which at its upper end is pivotally connected to the said flange 69 at a point thereon spaced to the right of the said vertical axis of the trunnion, as seen in Figure 4. In the position of the wheel shown in solid lines in Figure 4, it should be noted that the rod 112 does not support the brake-shoe 99 which has been lifted by the motion of the brake-drum to a position such that the pin 114 is located well below the upper extremity of the slot 115, and it is to be further noted that the spring 109 which connects the two brake-levers is aiding gravity to exert a light force upon the brake-lever 99 to cause light contact between the brake-lining and the brake-drum.

It will be seen, however, that in the said position of the wheel 14 the brake-shoe 100 is supported by the rod 116 and that the brake-shoe lever 104 is swung slightly in a counter-clockwise direction about its pivot 106. In this position the brake-shoe 100 is held out of contact with the brake-drum. These above noted positions of the two brake-shoes can only exist when the wheel occupies the position shown in solid lines in Figure 4, and when the wheel is rotating in a clockwise direction. Should the rotation of the wheel and brake-drum be reversed so as to make it counter-clockwise, the brake-shoe 99 is immediately dragged upon by the brake-drum and, moving downwardly, receives an outward thrust from the brake-lever 103, whereupon brake-shoe 99 immediately becomes a brake in fact and stops the counter-clockwise rotation of the drum and wheel. Cessation of counter-clockwise rotation of the wheel 14, which it should be mentioned is caused by a reversal of travel of the vehicle from left to right or right to left, causes the wheel to grip the ground, whereupon the arm 57 assumes the position shown in dotted lines in Figure 4 as the trunnion and saddle move to the left with the movement of the vehicle.

In this new position of the wheel, the brake-shoe 99 has been lifted by the lifting-rod 112 and has assumed an inoperative position relative to the brake-drum similar to that formerly occupied by the brake-shoe 100, in which position its lining is clear of the brake-drum. At the same time the brake-shoe 100 has assumed a position similar to that formerly occupied by brake-shoe 99 and is now no longer supported by the lifting-rod 116, but is floating lightly in contact with the interior of the brake-drum, between which and the brake-shoe lining little or no effective friction exists. Another reversal of the direction of travel of the vehicle will cause a reversal in the direction of rotation of both wheel and brake-drum, whereupon brake-shoe 100 will become an effective brake to stop rotation of the wheel and, thereafter, again swing the arm and wheel to the full line position shown in Figure 4. Covering the openings 122, see Figure 5, formed in the brake-drum cover 98 for the passage therethrough of pins 114 and 117, are plates or covers 123. These covers fit about the offset portions or pins 114 and 117 of the rods 112 and 116 and move therewith when the said rods are lifted or lowered. They serve merely as shields to prevent dirt or grease entering through the slots in the brake-drum cover. They are prevented from swinging out of position by means of spring retaining plates 124, which plates are each riveted or otherwise fastened at one end to the brake-drum cover and at the other end overlie one of the cover plates 123.

By reference to Figure 6 it will be seen in what way one of the brake-levers 103 is disposed and mounted. As shown, it is pivotally mounted upon a pin 125, which is threaded into the arm 57 and locked in place by means of a nut 126. At its free end the lever 103, and similarly lever 104, is forked to embrace a web 127 forming a portion of the brake-shoe, the parts being held in position by the pivot pin 107 hereinbefore mentioned.

It has been found in practice that when a vehicle of the single caster wheel type is towed over rough roads at relatively high speeds, some means must be employed to prevent the wheel-supporting arm or half-fork from being swung ahead of its proper trailing position by jolts received when the wheel 14 strikes substantial obstructions in the road. This is accomplished, by the present invention, through the use of a resilient locking means or detent means which hinders the swinging of the arm 57 out of the position it properly should occupy in accordance with the direction in which the vehicle is traveling. This detent means does not, however, prevent the swinging of the arm when it is proper that it should do so.

Referring to Figures 4 and 6, the before mentioned disk 120 is pivotally mounted upon the inner side of the arm 57 by means of a bolt 128. The face of disk 120 which faces toward the arm 57, is provided with three ball cups 129, spaced 120° apart, which register with three similar but deeper cups 130 formed in the arm 57. Normally resting in these registering cups in one position of the arm 57 are three ball detent members 131. A spring 132 interposed between the outer surface of the arm 57 and a spring retaining washer 133 by means of which the spring may be compressed when an adjustment nut 134 is threaded inwardly upon bolt 128, serves to resist bodily movement of disk 120 in a direction to increase the space between it and arm 57. But relative rotative movement must take place between these parts when the arm swings from one side to the other of the axis of the trunnion 58. To enable the disk 120 to rotate relatively to the arm 57 it must first move sufficiently to the left, as seen in Figure 6, to permit of unseating the cups 129 with respect to the balls 131. In the position shown in Figure 4, in which the balls are in registry with the cups or pockets in both the arm and disk, it will be understood that considerable effort must be exerted to swing the arm and force the steel balls out of the pockets in the disk 120. It is not, however, impossible to move the arm, for when sufficient rotative force is exerted by means of the lock-rod 121 upon the disk 120, the tension of the spring 132 is overcome, and the disk cups are forced out of registering with the balls which then serve as bearings. This occurs when the direction of travel is reversed. The plate 120 will then assume the position shown in dotted lines in Figure 4, and the balls will register with other cups 135 provided in the surface of the plate 120 at properly spaced intervals from the cups 130. Because the pockets in the arm are deeper than the pockets in the plate, the balls are retained in the arm pockets and when the motion of the trailer is again reversed, the plate moves back to its former position so that the balls 131 again register and lock with cups 130. It should here be noted that the rods 112, 116 and 121 are adjustable as to length in any suitable manner, as by means of a threaded connection between their clevis ends 136 and the respective rods, said adjustments being maintained by means of nuts 137.

By reference to Figure 1 it will be seen that the wheel 14 is provided with a mudguard or fender 138 approximately mounted upon the arm 57 and that the saddle member 44 is provided with means 139 for supporting a license plate.

Referring to Figures 1 and 3, attention is called to the fact that the two A frames 42 are united by means of a torque tube 140 which is bolted to the frames by means of flanges formed on the tube as indicated at 141 in Figure 3; or, omitting the flanges, the tube ends may be welded directly to the sides of the frames. This tube and the A frames form a substantially rigid unitary structure capable of resisting successfully all strains and stresses tending, under conditions of use, to separate or alter the relative positions of the component parts thereof.

Means is provided for supporting the forward end of the trailer body 13 when the trailer is disconnected from the vehicle frame 10. This means comprises legs 142 pivotally mounted, as at 143, to brackets 144, which are preferably bolted or riveted to the sides of the body 13 adjacent the forward ends thereof, and since the mountings of both legs to their respective brackets are preferably identical it will suffice to detail the mounting and construction of but one leg.

Each leg may be swung up beneath the body of the trailer when not needed for support, as shown in solid lines in Figure 1, or it may be dropped to supporting position as shown in dotted lines in the same figure. In the latter position it is held and braced by means of a jointed link construction comprising members 145 and 146. A lug 147 formed upon the extension of link 146 beyond the pivot 148 engages the upper edge of link 145 to limit rotative movement of the links about the said pivot. This lug permits the joint at 148 to break upwardly when it is desired to lift the leg 142 to its inoperative position, but prevents movement of the links downwardly beyond their position of end to end alignment. The leg is retained in lifted position by means of a suitable spring latch 149. The link 146 is pivoted at 150 intermediate the ends of the leg 142, and the link 145 is pivotally mounted upon the trailer body in any suitable manner, as at 151. With this mounting, when the leg is moved to its inoperative position, the links are lifted and closed like a jack-knife and then occupy the position shown in solid lines in Figure 1. Each leg is provided with a foot 152 adapted to give proper bearing service for contact with the ground.

It will thus be seen that there has been provided in this invention an apparatus in which the several objects hereinabove described, as well as many thoroughly practical advantages, are successfully achieved.

As many possible embodiments may be made of the above invention without departing from the scope thereof, it is to be understood that all matter herein set forth or shown in the accompanying drawings is to be interpreted as illustrative and not in a limiting sense.

I claim as my invention:

1. In an apparatus of the character described, in combination, a vehicle body or frame, a member carrying a wheel, a bearing assembly securing said member to said body adapted to permit said member to pivot about a substantially vertical axis and about a substantially horizontal axis, means limiting the pivoting movement about said horizontal axis to such an extent as to permit said wheel to assume either of two castering positions, a brake-housing rotatable with said wheel, a pair of brake-shoes adapted to engage the interior of said housing, upon opposite sides of the wheel axis, a lever pivotally connected to said arm and to one of said brake-shoes, a lever pivotally connected to said arm and the other of said brake-shoes, said levers being so positioned as to cause the weight of said brake-shoes to bring them into frictional engagement with said brake-housing, a spring connecting said brake levers and tending to hold said brake-shoes in engagement with said housing, a linkage pivotally connected with said bearing assembly upon one side of said horizontal axis and having limited slidable connection with one of said brake-shoes, a linkage pivotally connected with said bearing assembly upon the other side of said horizontal axis and having limited slidable connection with the other of said shoes, said linkages being adapted in certain positions of said arm positively to hold their respective brake-shoes out of operative relation with said brake-housing, and a yielding locking device interposed between said arm and one of said linkages for restraining movement of said arm about its horizontal axis.

2. In an apparatus of the character described, in combination, a vehicle body or frame, a member carrying a wheel, a bearing assembly securing said member to said body adapted to permit said member to pivot about a substantially vertical axis and about a substantially horizontal axis, means limiting the pivoting movement about said horizontal axis to such an extent as to permit said wheel to assume either of two castering positions, a brake-housing rotatable with said wheel, a pair of brake-shoes adapted to engage the interior of said housing, upon opposite sides of the wheel axis, a lever pivotally connected to said arm and to one of said brake-shoes, a lever pivotally connected to said arm and the other of said brake-shoes, said levers being so positioned as to cause the weight of said brake-shoes to bring them into frictional engagement with said brake-housing, a spring connecting said brake levers and tending to hold said brake-shoes in engagement with said housing, a linkage pivotally connected with said bearing assembly upon one side of said horizontal axis and having limited slidable connection with one of said brake-shoes, and a linkage pivotally connected with said bearing assembly upon the other side of said horizontal axis and having limited slidable connection with the other of said shoes, said linkages being adapted in certain positions of said arm positively to hold their respective brake-shoes out of operative relation with said brake-housing.

3. In an apparatus of the character described, in combination, a vehicle body or frame, a member carrying a wheel, a bearing assembly securing said member to said body adapted to permit said member to pivot about a substantially vertical axis and about a substantially horizontal axis, means limiting the pivoting movement about said horizontal axis to such an extent as to permit said wheel to assume either of two castering positions, a brake-housing rotatable with said wheel, a pair of brake-shoes adapted to engage the interior of said housing, upon opposite sides of the wheel axis, a lever pivotally connected to said arm and to one of said brake-shoes, a lever pivotally connected to said arm and the other of said brake-shoes, said levers being so positioned as to cause the weight of said brake-shoes to bring them into frictional engagement with said brake-housing, a linkage pivotally connected with said bearing assembly upon one side of said horizontal axis and having limited slidable connection with one of said brake-shoes, a linkage pivotally connected with said bearing assembly upon the other side of said horizontal axis and having limited slidable connection with the other of said shoes, said linkages being adapted in certain positions of said arm positively to hold their respective brake-shoes out of operative relation with said brake-housing, and a yielding locking device interposed between said arm and one of said linkages for restraining movement of said arm about its horizontal axis.

4. In an apparatus of the character described, in combination, a vehicle body or frame, a member carrying a wheel, a bearing assembly securing said member to said body adapted to permit said member to pivot about a substantially vertical axis and about a substantially horizontal axis, means limiting the pivoting movement about said horizontal axis to such an extent as to permit said wheel to assume either of two castering positions, a brake-housing rotatable with said wheel, a pair of brake-shoes adapted to engage the interior of said housing, upon opposite sides of the wheel axis, a lever pivotally connected to said arm and to one of said brake-shoes, a lever pivotally connected to said arm and the other of said brake-shoes, said levers being so positioned as to cause the weight of said brake-shoes to bring them into frictional engagement with said brake-housing, a linkage pivotally connected with said bearing assembly upon one side of said horizontal axis and having limited slidable connection with one of said brake-shoes, and a linkage pivotally connected with said bearing assembly upon the other side of said horizontal axis and having limited slidable connection with the other of said shoes, said linkages being adapted in certain positions of said arm positively to hold their respective brake-shoes out of operative relation with said brake-housing.

5. In an apparatus of the character described, in combination, a vehicle body or frame, a member carrying a wheel, a bearing assembly securing said member to said body adapted to permit said member to pivot about a substantially vertical axis and about a substantially horizontal axis, means limiting the pivoting movement about said horizontal axis to such an extent as to permit said wheel to assume either of two castering positions, a brake-housing rotatable with said wheel, a pair of brake-shoes adapted to engage the interior of said housing, upon opposite sides of the wheel axis, a lever pivotally connected to said arm and to one of said brake-shoes, a lever pivotally connected to said arm and the other of said brake-shoes, said levers being so positioned as to cause the weight of said brake-shoes to bring them into frictional engagement with said brake-housing, and a spring connecting said brake levers and tending to hold said brake-shoes in engagement with said housing.

6. In an apparatus of the character described, in combination, a vehicle body or frame, a member carrying a wheel, a bearing assembly securing said member to said body adapted to permit said member to pivot about a substantially vertical axis and about a substantially horizontal axis, means limiting the pivoting movement about said horizontal axis to such an extent as to permit said wheel to assume either of two castering positions, a brake-housing rotatable with said wheel, a pair of brake-shoes adapted to engage the interior of said housing, upon opposite sides of the wheel axis, a lever pivotally connected to said arm and to one of said brake-shoes, a lever pivotally connected to said arm and the other of said brake-shoes, said levers being so positioned as to cause the weight of said brake-shoes to bring them into frictional engagement with said brake-housing.

7. In an apparatus of the character described, in combination, a vehicle frame or body, means secured thereto for oscillation about a vertical axis and having an arm pivoted thereto for limited oscillation about a horizontal axis, a wheel carried by said arm, a brake-housing rotatable with said wheel, a brake-shoe mounted upon said arm in operative relation with said housing upon one side of the wheel axis and adapted to be held out of braking relation with said housing by the rotation thereof in one direction, and to become effective as a brake upon a reversal of the direction of rotation of said wheel, to cause said arm and wheel to assume a position upon one side of a vertical plane passing through the said horizontal axis, a second brake-shoe similarly mounted upon said arm in operative relation to said housing upon the opposite side of said wheel axis and similarly effective as a brake to cause said arm to assume a position upon the other side of said vertical plane, means adapted upon oscillation of said arm about its horizontal axis in either direction to move the previously effective brake-shoe into an inoperative position relative to said brake-housing, and means associated with said last means for preventing accidental oscillation of said arm about its horizontal axis from causes other than the reversal of rotation of said wheel.

8. In an apparatus of the character described, in combination, a vehicle frame or body, means secured thereto for oscillation about a vertical axis and having an arm pivoted thereto for limited oscillation about a horizontal axis, a wheel carried by said arm, a brake-housing rotatable with said wheel, a brake-shoe mounted upon said arm in operative relation with said housing upon one side of the wheel axis and adapted to be held out of braking relation with said housing by the rotation thereof in one direction, and to become effective as a brake upon a reversal of the direction of rotation of said wheel, to cause said arm and wheel to assume a position upon one side of a vertical plane passing through the said horizontal axis, a second brake-shoe similarly mounted upon said arm in operative relation to said housing upon the opposite side of said wheel axis and similarly effective as a brake to cause said arm to assume a position upon the other side of said vertical plane, and means adapted upon oscillation of said arm about its horizontal axis in either direction to move the previously effective brake-shoe into an inoperative position relative to said brake-housing.

9. In an apparatus of the character described, in combination, a vehicle body or frame, a member carrying a wheel, a bearing assembly securing said member to said body adapted to permit said member to pivot about a substantially vertical axis and about a substantially horizontal axis, means limiting the pivoting movement about said horizontal axis to such an extent as to permit said wheel to assume either of two castering positions, a brake-housing rotatable with said wheel, a pair of brake-shoes co-acting with said brake-housing, one of said brake-shoes being mounted to permit rotation of said wheel in a clockwise direction and to prevent rotation of said wheel in a counterclockwise direction when said wheel is in one of its said castering positions, the other of said brake-shoes being mounted to permit rotation of said wheel in a counter-clockwise direction and prevent rotation in a clockwise direction when said wheel is in the other of its said castering positions, and means depending upon the castering position assumed by said wheel for holding one or the other of said brake-shoes in an inoperative position, said means comprising links interposed between said brake-shoes and said bearing assembly.

10. In an apparatus of the character described, in combination, a vehicle body or frame, a member carrying a wheel, a bearing assembly securing said member to said body adapted to permit said member to pivot about a substantially vertical axis and about a substantially horizontal axis, means limiting the pivoting movement about said horizontal axis to such an extent as to permit said wheel to assume either of two castering positions, a brake-housing rotatable with said wheel, a pair of brake-shoes co-acting with said brake-housing, one of said brake-shoes being mounted to permit rotation of said wheel in a clockwise direction and to prevent rotation in a counter-clockwise direction when said wheel is in one of its said castering positions, the other of said brake-shoes being mounted to permit rotation of said wheel in a counter-clockwise direction and prevent rotation in a clockwise direction when said wheel is in the other of its said castering positions, and means depending upon the castering position assumed by said wheel for holding one or the other of said brake-shoes in an inoperative position.

11. In an apparatus of the character described, in combination, a vehicle body or frame, a member carrying a wheel, a bearing assembly securing said member to said body adapted to permit said member to pivot about a substantially vertical axis and about a substantially horizontal axis, means limiting the pivoting movement about said horizontal axis to such an extent as to permit said wheel to assume either of two castering positions, a brake-housing rotatable with said wheel, and a pair of brace-shoes co-acting with said brake-housing, one of said brake-shoes being mounted to permit rotation of said wheel in a clockwise direction and to prevent rotation in a counter-clockwise direction when said wheel is in one of its said castering positions, the other of said brake-shoes being mounted to permit rotation of said wheel in a counter-clockwise direction and prevent rotation in a clockwise direction when said wheel is in the other of its said castering positions.

12. In an apparatus of the character described, in combination, a vehicle body or frame, a member carrying a wheel, a bearing assembly securing said member to said body adapted to permit said member to pivot about a substantially vertical axis and about a substantially horizontal axis, means limiting the pivoting movement about said horizontal axis to such an extent as to permit said wheel to assume either of two castering positions, a brake-housing rotatable with said wheel, a brake-shoe coacting with said brake-housing, said brake-shoe being mounted to permit rotation of said wheel in one direction and to prevent rotation in the opposite direction when said wheel is in one of its castering positions, and a rod interposed between said brake-shoe and said bearing assembly, said rod having a pivotal connection with one of said parts and a pin-and-slot connection with the other of said parts.

13. In an apparatus of the character described in combination, a vehicle body or frame, a member carrying a wheel, a bearing assembly securing said member to said body adapted to permit said member to pivot about a substantially vertical axis and about a substantially horizontal axis, means limiting the pivoting movement about said horizontal axis to such an extent as to permit said wheel to assume either of two castering positions, a brake-housing rotatable with said wheel, a brake-shoe co-acting with said brake-housing, said brake-shoe being mounted to permit rotation of said wheel in one direction and to prevent rotation in the opposite direction when said wheel is in one of its said castering positions, and a rod interposed between said brake-shoe and said bearing assembly, the said rod having pivotal connection with said bearing assembly and limited slidably connection with said brake-shoe.

14. In an apparatus of the character described, in combination, a vehicle body or frame, a member carrying a wheel, a bearing assembly securing said member to said body adapted to permit said member to pivot about a substantially vertical axis and about a substantially horizontal axis, means limiting the pivoting movement about said horizontal axis to such an extent as to permit said wheel to assume either of two castering positions, a brake-housing rotatable with said wheel, a brake-shoe co-acting with said brake-housing, said brake-shoe being mounted to permit rotation of said wheel in one direction and to prevent rotation in the opposite direction when said wheel is in one of its castering positions, and operating means interposed between said brake-shoe and said bearing assembly.

15. In an apparatus of the character described, in combination, a vehicle body or frame, a member carrying a wheel, a bearing assembly securing said member to said body adapted to permit said member to pivot about a substantially vertical axis and about a substantially horizontal axis, means limiting the pivoting movement about said horizontal axis to such an extent as to permit said wheel to assume either of two castering positions, a brake-housing rotatable with said wheel, a brake-shoe co-acting with said brake housing, said brake-shoe being mounted to permit rotation of said wheel in one direction and to prevent rotation in the opposite direction when said wheel is in one of its said castering positions, and means adapted to render said brake-shoe ineffective to prevent rotation when said wheel occupies its other said castering position.

16. In a construction of the character described, in combination, a vehicle body or frame, adapted at one end to be secured to another vehicle and provided with at least one wheel at the other end thereof, a trunnion supporting said wheel adapted to swing about a vertical axis within a housing on said frame, means providing upwardly and downwardly facing bearings on said housing, an upwardly facing bearing on said trunnion adapted to co-act with said downwardly facing bearing, a friction washer disposed between said co-acting bearings adapted to restrain swinging about said vertical axis to a degree which is a function of the load upon said body, a friction washer adapted to co-act with the upwardly turned bearing on said housing, spring controlled means upon said trunnion for co-acting with said bearing and said washer to provide predetermined resistance to swinging about said vertical axis, and substantially frictionless means for providing lateral support to said trunnion, said means being positioned within said housing adjacent the ends thereof.

17. In a construction of the character described, in combination, a vehicle body or frame adapted at one end to be secured to another vehicle and provided with at least one wheel at the other end thereof, a trunnion supporting said wheel adapted to swing about a vertical axis within a housing on said frame, means providing upwardly and downwardly facing bearings on said housing, an upwardly facing bearing on said trunnion adapted to co-act with said downwardly facing bearing, a friction washer disposed between said co-acting bearings adapted to restrain swinging about said vertical axis to a degree which is a function of the load upon said body, a friction washer adapted to co-act with the upwardly turned bearing on said housing, and spring controlled means upon said trunnion for co-acting with said bearing and said washer to provide predetermined resistance to swinging about said vertical axis.

18. In a construction of the character described, in combination, a vehicle body or frame adapted at one end to be secured to another vehicle and provided with at least one wheel at the other end thereof, means including two bearing members one of which is rotatable relative to the other for mounting said wheel to permit swinging thereof about a substantially vertical axis, means responsive to a function of the load carried by said body variably and proportionately offering frictional resistance to swinging about said axis, spring controlled means for frictionally resisting swinging about said axis irrespective of the load carried by said body, and means coacting with said two bearing members for determining the range of swinging of said wheel about said vertical axis.

19. In a construction of the character described, in combination, a vehicle body or frame adapted to be attached at one end to another vehicle, means at the other end of the body for supporting a wheel, said supporting means including two bearing members, one of which is rotatable relative to the other and having means confining rotation of one relative to the other to a certain angle, and being adapted to permit said wheel to pivot about a substantially vertical axis, a two-stage friction device for restraining swinging of said wheel-supporting means about said vertical axis, one stage of said device being positioned to offer frictional resistance to swinging in proportion to the load upon said wheel, and means for adjustably predetermining the frictional resistance of the other stage of said device irrespective of the load upon the wheel.

20. In a construction of the character described, in combination, a vehicle body or frame adapted to be attached at one end to another vehicle, means at the other end of the body for supporting a wheel, said supporting means being adapted to permit said wheel to pivot about a substantially vertical axis, said supporting means including a part relatively fixed with respect to said body and a stop member movable with said wheel and about the axis of the latter for engaging said relatively fixed member, thereby to limit the angle of pivoting of said wheel, a two-stage friction device for restraining swinging of said wheel-supporting means about said vertical axis, the frictional resistance of one stage of said device being determined by the load upon the vehicle body, and means for adjusting the frictional resistance of the other stage of said device.

21. In a construction of the character described, in combination, a vehicle body or frame adapted to be attached at one end to another vehicle, means at the other end of the body for supporting a wheel, said supporting means being adapted to permit said wheel to pivot about a substantially vertical axis and comprising a sleeve-like bearing member attached to said body and a stud member attached to said wheel, said two members being provided with stop members for limiting the angle of swing of said stud member relative to said sleeve member, thereby to limit the angle of swinging of said wheel about said vertical axis, and a two-stage friction device for restraining swinging of said wheel-supporting means about said vertical axis, the frictional resistance of one stage of said device being determined by the load upon the vehicle body.

22. A one-wheel trailer adapted to be hitched to a vehicle by two brackets and comprising, in combination, a frame, a castering wheel rotatably mounted upon a shaft supported at one end in a single side arm mounted upon said frame, said arm extending radially from the hub of the wheel along one side of the wheel to a point beyond the circumference thereof, means pivotally supporting the outer end of said arm for swinging movement about a horizontal axis substantially parallel to the axis of the wheel, means mounting said supporting means to said frame for rotation about a substantially vertical axis, and means for limiting the swinging movement of said arm.

23. A one-wheel trailer adapted to be hitched to a vehicle by two brackets and comprising, in combination, a frame, a castering wheel rotatably mounted upon a shaft supported at one end in a single side arm mounted upon said frame, said arm extending radially from the hub of the wheel along one side of the wheel to a point beyond the circumference thereof, bearing means mounted to said frame and adapted to rotatably support a member for rotation about a substantially vertical axis, and a member rotatably supported by said bearing means, said member having horizontally spaced bearing means at its lower end and said arm having means extending substantially parallel to the axis of the wheel for coacting in said horizontally spaced bearing means, whereby said arm and said wheel may swing about the axis of said last-mentioned bearing means.

24. A one-wheel trailer adapted to be hitched to a vehicle by two brackets and comprising, in combination, a frame, a castering wheel rotatably mounted upon a shaft supported at one end in a single side arm mounted upon said frame, said arm extending radially from the hub of the wheel along one side of the wheel to a point beyond the circumference thereof, means mounting the outer end of said arm upon said frame for rotation about a substantially vertical axis and for swinging about a substantially horizontal axis but throughout a limited extent, mechanism for controlling the direction of rotation of said wheel about its own axis, and control mechanism for said first-mentioned mechanism, including means extending lengthwise of said arm, and responsive to the position of said arm about its horizontal axis.

25. In an apparatus of the character described, in combination, a vehicle frame or body, means secured thereto for oscillation about a vertical axis and having an arm pivoted thereto for limited oscillation about a horizontal axis, a stub spindle projecting from the lower end of said arm in parallel relation to said horizontal axis, a wheel having an inflated tire mounted to rotate upon said spindle in a plane of said vertical axis, said arm and spindle providing a wheel mounting adapted to permit of tire changing without the removal of said wheel from its support, said means being in the form of a multiple bearing member having a portion whereby said means is oscillated about a vertical axis and having a lower portion providing the said horizontal axis about which said arm is pivoted, the pivotal connection between said arm and said multiple bearing member being at the lower end of the latter and at the upper end of the arm.

26. In an apparatus of the character described, in combination, a vehicle body or frame, a wheel rotatably mounted on a stub shaft or spindle, a wheel support upon said frame adapted to permit rotation of said wheel about a substantially horizontal axis and to permit said wheel to rotate about a substantially vertical axis, said support comprising an arm offset laterally from said vertical axis and oscillatable throughout a limited extent about a horizontal axis and extending to and connected with one end of said stub spindle and constituting the sole supporting means for said spindle, and means for affecting the direction of rotation of the wheel about its own axis and including control means extending lengthwise of said arm and responsive to the position of said arm relative to its said horizontal axis.

27. In an apparatus of the character described, in combination, a vehicle frame or body, a bearing assembly carried by said frame and rotatable about a substantially vertical axis, a wheel, a spindle for rotatably mounting said wheel, and one-armed support offset laterally from the axis of said bearing assembly and having its upper end in pivotal connection with said bearing assembly for pivoting relative to the latter but about a horizontal axis, means at the lower end of said arm adapted to provide the sole means of support for said spindle, mechanism adapted to affect the direction of rotation of said wheel about said spindle, and control means for said mechanism including a part extending lengthwise of said arm and connected to said bearing assembly and responsive to the swing of said arm about its said horizontal axis.

28. In an apparatus of the character described, in combination, a vehicle frame or body, a member carrying a wheel, means pivoting said member to said body for limited movement to either side of the horizontal axis of the pivot, means for substantially locking said wheel against rotation upon movement of said vehicle in a direction toward that side of the vertical plane through said horizontal axis upon which the axis of the wheel happens to be while permitting rotation of the wheel in the opposite direction, and means for yieldably resisting movement of said member about its horizontal pivot.

29. In an apparatus of the character described, in combination, a vehicle frame or body, a member carrying a wheel, means pivoting said member to said body for limited movement to either side of the horizontal axis of the pivot, means responsive to movement of said vehicle in a direction toward that side of the vertical plane through said horizontal axis upon which the axis of the wheel happens to be for resisting rotation of the wheel, and means for yieldably resisting movement of said member about its horizontal pivot.

HOLMAN H. LINN.